United States Patent
Lu et al.

(10) Patent No.: US 11,460,986 B2
(45) Date of Patent: Oct. 4, 2022

(54) METHOD FOR PICTURE DISPLAY, DEVICE, TERMINAL AND COMPUTER READABLE STORAGE MEDIUM

(71) Applicant: CHENGDU STAR ERA AEROSPACE TECHNOLOGY CO., LTD., Sichuan (CN)

(72) Inventors: Chuan Lu, Sichuan (CN); Long Wang, Sichuan (CN); Shuting Zhou, Sichuan (CN)

(73) Assignee: CHENGDU STAR ERA AEROSPACE TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 17/419,598

(22) PCT Filed: Sep. 27, 2020

(86) PCT No.: PCT/CN2020/118123
§ 371 (c)(1),
(2) Date: Jun. 29, 2021

(87) PCT Pub. No.: WO2021/129013
PCT Pub. Date: Jul. 1, 2021

(65) Prior Publication Data
US 2022/0100356 A1  Mar. 31, 2022

(30) Foreign Application Priority Data
Dec. 26, 2019 (CN) .......................... 201911371859.2

(51) Int. Cl.
*G06F 3/04842* (2022.01)
*G09G 3/20* (2006.01)
*G06F 3/0488* (2022.01)

(52) U.S. Cl.
CPC ........... *G06F 3/04842* (2013.01); *G09G 3/20* (2013.01); *G06F 3/0488* (2013.01); *G09G 2354/00* (2013.01); *G09G 2380/16* (2013.01)

(58) Field of Classification Search
CPC ..... G06F 3/04842; G06F 3/0488; G09G 3/20; G09G 2354/00; G09G 2380/16
See application file for complete search history.

(56) References Cited

U.S. PATENT DOCUMENTS

| | | |
|---|---|---|
| 2008/0211802 A1 | 9/2008 | Yun et al. |
| 2014/0168168 A1 | 6/2014 | Ichieda |

(Continued)

FOREIGN PATENT DOCUMENTS

| | | |
|---|---|---|
| CN | 101256731 A | 9/2008 |
| CN | 103870233 A | 6/2014 |

(Continued)

OTHER PUBLICATIONS

China National Intellectual Property Administration, Notice of Allowance for Chinese Patent Application No. 201911371859.2, dated Nov. 2, 2020, 8 Pages (including English Translation).

(Continued)

*Primary Examiner* — Peter D McLoone
(74) *Attorney, Agent, or Firm* — Brooks Kushman P.C.

(57) ABSTRACT

A method for displaying pictures, a device, a terminal and a computer readable storage medium. The display interface includes a display region and operation region, and the method includes: switching a picture in the display region a picture to be switched corresponding to the picture switching operation in response to the picture switching operation in the operation region. In the embodiments of the present disclosure, by providing an operation region in the display interface, as long as a user performs the picture switching operation in the operation region, the picture displayed in the (Continued)

display region can be replaced and updated, so that the user can flexibly switch the picture to be displayed, thus improving the user experience.

7 Claims, 6 Drawing Sheets

(56) References Cited

U.S. PATENT DOCUMENTS

| | | | |
|---|---|---|---|
| 2014/0184547 A1 | 7/2014 | Tokunaga | |
| 2015/0097869 A1* | 4/2015 | Oh | G06T 3/40 345/635 |
| 2015/0160821 A1* | 6/2015 | Cho | G16H 30/20 715/769 |
| 2018/0018927 A1 | 1/2018 | Amirkhany | |
| 2018/0292963 A1* | 10/2018 | Nanjo | G06F 3/04855 |
| 2019/0088187 A1 | 3/2019 | Yan | |
| 2019/0212916 A1 | 7/2019 | Wang | |

FOREIGN PATENT DOCUMENTS

| | | |
|---|---|---|
| CN | 103927093 A | 7/2014 |
| CN | 103995652 A | 8/2014 |
| CN | 104011641 A | 8/2014 |
| CN | 105005429 A | 10/2015 |
| CN | 106598390 A | 4/2017 |
| CN | 106856543 A | 6/2017 |
| CN | 106910487 A | 6/2017 |
| CN | 107633796 A | 1/2018 |
| CN | 108427589 A | 8/2018 |
| CN | 109597550 A | 4/2019 |
| CN | 110134300 A | 8/2019 |
| CN | 110221794 A | 9/2019 |
| CN | 110517758 A | 11/2019 |
| CN | 111158620 A | 5/2020 |

OTHER PUBLICATIONS

China National Intellectual Property Administration, Second Office Action for Chinese Patent Application No. 201911371859.2, dated Aug. 4, 2020, 26 Pages (including English Translation).
China National Intellectual Property Administration, First Office Action for Chinese Patent Application No. 201911371859.2, dated Jul. 1, 2020, 20 Pages (including English Translation).
China National Intellectual Property Administration (acting as International Search Authority) International Search Report and Written Opinion for Application No. PCT/CN2020/118123, dated Dec. 30, 2020, 11 Pages.

* cited by examiner

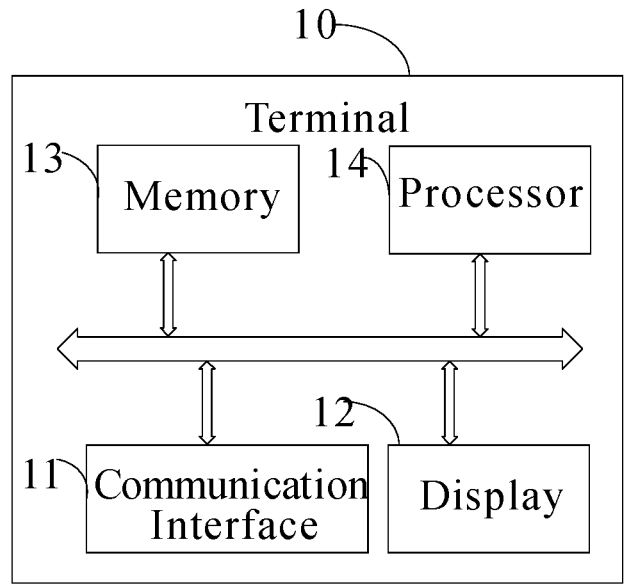
FIG. 1
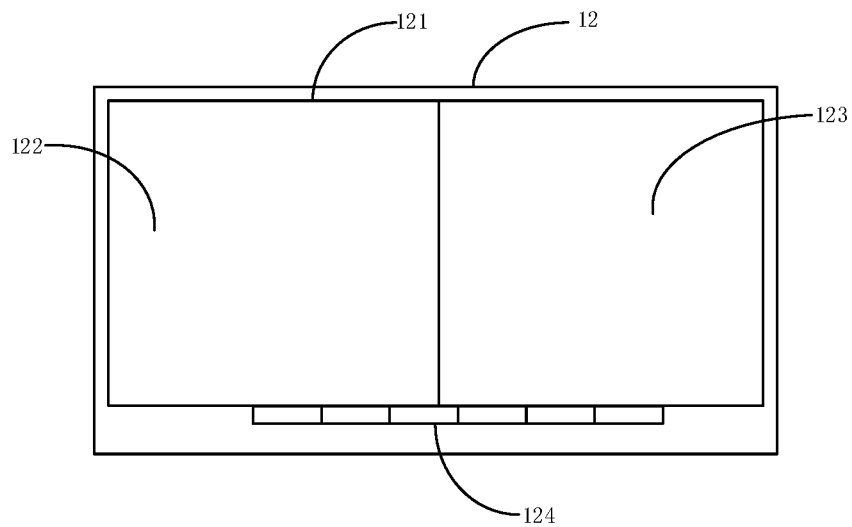
FIG. 2
| In response to a picture switching operation in an operation region, switching a picture in a display region to a picture to be switched corresponding to the picture switching operation | S10 |
FIG. 3

METHOD FOR PICTURE DISPLAY, DEVICE, TERMINAL AND COMPUTER READABLE STORAGE MEDIUM

CROSS-REFERENCE TO RELATED APPLICATIONS

This application is the U.S. national phase of PCT Application No. PCT/CN2020/118123 filed on Sep. 27, 2020, which claims priority to Chinese Patent Application No. 201911371859.2 filed on Dec. 26, 2019, the contents of both of which are hereby incorporated herein by reference in their entireties.

TECHNICAL FIELD

Embodiments of the present disclosure relate to, but are not limited to, the technical field of computer technology, in particular to a method for displaying pictures, a device, a terminal and a computer readable storage medium.

BACKGROUND

In the related art, in order to view two pictures at the same time, some software developers put two pictures in two different regions on a display interface. For example, a display interface is divided into a display region A and a display region B, wherein a picture X is displayed in the display region A and a picture Y is displayed in the display region B. The user may compare contents of the two pictures by viewing the pictures in the two display regions respectively.

However, the problem of this comparative way of display is that it is unable to flexibly switch between pictures to be displayed. When it is necessary to switch to another picture, the user must re-find the storage folder of the other picture and reopen the picture, and for the convenience of comparison, it is also necessary to further move the reopened picture to the display region A, thus comparing pictures in the manner above is time-consuming and degrades the user experience.

SUMMARY

A summary of the subject matter described in detail herein is provided below. The summary is not intended to limit the protection scope of the claims.

Embodiments of the present disclosure provide a method for displaying pictures, a device, a terminal and a computer readable storage medium.

In a first aspect, an embodiment of the present disclosure provides a method for displaying pictures, and a display interface may include: a display region and an operation region;

in response to a picture switching operation in the operation region, switching a picture in the display region to a picture to be switched corresponding to the picture switching operation.

In an exemplary implementation, the display region may include a first display region and a second display region;

wherein in response to the picture switching operation in the operation region, switching the picture in the display region to the picture to be switched corresponding to the picture switching operation may include:

displaying a first picture in the first display region and displaying a second picture in the second display region;

determining a third picture corresponding to the picture switching operation, determining the first display region corresponding to the picture switching operation, and replacing the first picture displayed in the first display region with the third picture to be switched, or, determining the second display region corresponding to the picture switching operation, and replacing the second picture displayed in the second display region with the third picture to be switched.

In an exemplary implementation, the operation region may be disposed inside the display region or independently disposed outside the display region.

In an exemplary implementation, the display interface may include one or more display regions and at least one operation region; the operation region may include multiple sub-regions;

one display region corresponds to at least one sub-region, and one sub-region corresponds to one or one group of pictures to be switched; and/or, one sub-region corresponds to one or one group of pictures to be switched, and neither the sub-region nor any of the pictures to be switched corresponds to the display region.

In an exemplary implementation, when one display region corresponds to at least one sub-region and one sub-region corresponds to one or one group of pictures to be switched, switching the pictures in the display region to the pictures to be switched corresponding to the picture switching operation may include:

when one sub-region corresponds to one picture to be switched, determining a sub-region selected by the picture switching operation and a display region corresponding to the sub-region, and switching the picture in the display region corresponding to the sub-region to a picture to be switched corresponding to the sub-region;

when one sub-region corresponds to one group of pictures to be switched, determining the sub-region selected by the picture switching operation and the display region corresponding to the sub-region, presenting each picture in one group of pictures to be switched corresponding to the sub-region, detecting a selection operation on the presented pictures, and switching the pictures in the display region corresponding to the sub-region to the pictures selected by the selection operation; or, determining a preset probability corresponding to each picture, and switching the picture in the display region corresponding to the sub-region to a picture with the highest probability.

In an exemplary implementation, when one sub-region corresponds to one or one group of pictures to be switched, and neither the sub-region nor any of the pictures to be switched correspond to the display region, switching the pictures in the display region to the picture to be switched corresponding to the picture switching operation may include:

determining the number of display regions to be replaced;

determining a picture switching mode in the display region according to the number of the display regions to be replaced.

In an exemplary implementation, when the number of the display regions to be replaced is one, determining the picture switching mode in the display region according to the number of the display regions to be replaced includes:

displaying a selected picture to be switched in the display region according to the selection operation, or, replacing the pictures in the display region with the pictures to be switched in the sub-region according to a preset presentation order of each picture to be switched in all the pictures to be switched corresponding to the sub-region.

In an exemplary implementation, when the number of display regions to be replaced is multiple, determining the picture switching mode in the display region according to the number of the display regions to be replaced includes:

if each picture to be switched among all the pictures to be switched corresponding to the sub-region is correspondingly provided with a selection mark for all the display regions, determining multiple selected pictures to be switched according to the selection operation, and displaying each selected picture to be switched in a display region selected by the selection mark corresponding to the picture to be switched; and if each picture to be switched among all the pictures to be switched corresponding to the sub-region is not provided with a selection mark for all the display regions, after determining multiple selected pictures to be switched according to the selection operation, sequentially replacing the sorted pictures in the display region with the pictures to be switched in the sub-region according to the preset presentation order of each picture to be switched among all the pictures to be switched corresponding to the sub-region; or, sequentially replacing pictures in the display region that were not replaced in a last replacement operation with the pictures to be switched in the sub-region according to the presentation order; or, sequentially replacing multiple pictures displayed in the different display regions that have been sorted according to a selection order of the multiple selected pictures to be switched; or, randomly switching multiple pictures to be switched to pictures in the multiple display regions.

In an exemplary implementation, the display region may include a first display region sorted as the first and a second display region sorted as the second;

wherein sequentially replacing the sorted pictures in the display region with the pictures to be switched in the sub-region according to the preset presentation order of each picture to be switched in all the pictures to be switched corresponding to the sub-region may include:

automatically loading a first picture with a first presentation order in the multiple pictures to be switched into the first display region for display, and automatically loading a second picture with a second preset presentation order in the multiple pictures to be switched into the second display region for display.

In an exemplary implementation, determining the multiple selected pictures to be switched according to the selection operation, and displaying each selected picture to be switched in the display region selected by the selection mark corresponding to the picture to be switched may include:

when one sub-region corresponds to one picture to be switched, determining the sub-region selected by the picture switching operation, presenting one picture to be switched corresponding to the sub-region, providing selection marks for all display regions corresponding to the picture to be switched, detecting a selection operation on the provided selection marks, and replacing the pictures in the display region corresponding to a selection mark selected by the selection operation with the picture to be switched;

when one sub-region corresponds to one group of pictures to be switched, determining the sub-region selected by the picture switching operation, presenting one group of pictures to be switched corresponding to the sub-region, presenting each picture in the group of pictures to be switched, detecting a selection operation on the presented pictures, providing the selection marks for all the display regions corresponding to the picture after determining the selected picture, detecting a selection operation on the provided selection marks, and replacing the pictures in a display region corresponding to a selection mark selected by the selection operation with the selected picture to be switched.

In an exemplary implementation, the display region may include: a first display region and a second display region; wherein sequentially replacing the pictures in the display region that were not replaced in the last replacement operation with the pictures to be switched in the sub-region according to the display order may include:

acquiring a display position of a picture corresponding to a previously selected sub-region;

replacing a first picture displayed in the first display region with a third picture corresponding to the selected sub-region when the picture corresponding to the previously selected sub-region is displayed in the second display region; and replacing a second picture displayed in the second display region with the third picture corresponding to the selected sub-region when the picture corresponding to the previously selected sub-region is displayed in the first display region;

In an exemplary implementation, the method may further include:

continuously responding to multiple picture switching operations in the operation region, and determining a display region corresponding to the picture switching operation and a picture to be switched after responding to each picture switching operation;

and simultaneously switching a picture in a display region corresponding to each picture switching operation to the picture to be switched corresponding to the picture switching operation through one-click switching.

In an exemplary implementation, the method may further include:

when displaying a picture on the display interface for a first time, selecting pictures for initial display through the picture switching operation in response to the picture switching operation in the operation region, and determining a display mode on the display interface according to the number of the pictures selected for initial display.

In an exemplary implementation, determining the display mode on the display interface according to the number of the pictures selected for initial display may include:

acquiring the number of pictures to be switched selected in the picture switching operation;

when the number of the pictures to be switched is one, covering the display interface with the one picture to be switched to display the one picture to be switched on the display interface;

when the number of the pictures to be switched is multiple, dividing the display interface into multiple display regions by one or more divider lines, and displaying the multiple pictures to be switched in the multiple display regions respectively, so that the multiple pictures to be switched can be displayed simultaneously in the multiple display regions.

In an exemplary implementation, wherein selecting the pictures for initial display through the picture switching operation in response to the picture switching operation in the operation region, and determining the display mode on the display interface according to the number of the pictures selected for initial display may include:

acquiring the number of pictures to be switched selected in the picture switching operation in response to the picture switching operation in the operation region for the first time;

when the number of the pictures to be switched is one, covering the display interface with the one picture to be switched;

continuously responding to the picture switching operation in the operation region, and acquiring the number of the pictures to be switched selected in the current picture switching operation;

when the number of the pictures to be switched is two, dividing the display interface into a first display region and a second display region, displaying a first picture selected by the current picture switching operation in the first display region, and displaying a second picture selected by the current picture switching operation in the second display region.

In an exemplary implementation, the method may further include: changing sizes and/or shapes of the display regions by moving a position and/or a direction of the divider line.

In an exemplary implementation, the method may further include:

canceling the presentation of the picture to be switched corresponding to the picture switching operation on the display interface in response to a cancellation operation on the picture switching operation in the operation region;

detecting the number of pictures currently displayed on the display interface after canceling the picture to be switched corresponding to the picture switching operation; and adjusting a proportion of the pictures on the display interface according to the number of the pictures currently displayed on the display interface.

In an exemplary implementation, each sub-region may include at least one operation point, and each operation point corresponds to the display region, the sub-region, or at least one picture in the sub-region; when any one operation point is triggered, a corresponding function is operated in response to the triggering.

In an exemplary implementation, when one display region corresponds to at least one sub-region and one sub-region corresponds to one picture to be switched, the operation point of each sub-region is an operation point of the picture to be switched; the operation point is used to determine whether the picture to be switched is selected;

when one display region corresponds to at least one sub-region and one sub-region corresponds to one group of pictures to be switched, the operation point of each sub-region is used to determine whether the group of pictures to be switched is selected; each picture in the group of pictures to be switched corresponds to one sub-operation point, and the sub-operation point is used to determine whether the picture is selected;

when one sub-region corresponds to one picture to be switched and the picture to be switched corresponds to all display regions for selection, the operation point of each sub-region is an operation point of the picture to be switched, which is used to determine whether the picture to be switched is selected and select the display region to be replaced from all display regions; and when a sub-region corresponds to a group of pictures to be switched and a picture to be switched corresponds to all display regions for selection, the operation points of each sub-region is the operation points of the group of pictures to be switched, and the operation points are used to determine whether the group of pictures to be switched are selected, and each picture in the group of pictures to be switched corresponds to a sub-operation point, which is used to determine whether the picture is selected and select a display region to be replaced from all the display regions;

In the second aspect, an embodiment of the present disclosure further provides a device for displaying pictures, which may include a display module and a display adjustment module; wherein the display module may include a display interface, and the display interface includes a display region and an operation region;

the display adjustment module is configured to switch a picture in the display region corresponding to a picture switching operation to the picture to be switched corresponding to the picture switching operation in response to the picture switching operation in the operation region.

In a third aspect, an embodiment of the present disclosure further provides a terminal, which may include a memory, a display screen, and a processor connected to the memory and the display screen;

wherein the memory is configured to store a program of the method for displaying pictures according to any one of the above exemplary implementations;

and the processor is configured to run the program in the memory.

In a fourth aspect, an embodiment of the present disclosure further provides a computer readable storage medium that stores program instructions that, when executed, enables implementation of the method for displaying pictures in any of the above.

BRIEF DESCRIPTION OF DRAWINGS

The following is a brief description of accompanying drawings in embodiments of the present disclosure. It should be understood that, the following accompanying drawings indicate certain embodiments of the present disclosure, and therefore, should not be considered as a limitation of scope. For those of ordinary skills in the art, other related drawings can be obtained according to these drawings without paying any creative effort.

FIG. 1 is a schematic diagram of a structure of a terminal according to an embodiment of the present disclosure.

FIG. 2 is a schematic diagram of a display interface of a terminal according to an embodiment of the present disclosure.

FIG. 3 is a flowchart of a method for displaying pictures according to an embodiment of the present disclosure.

DETAILED DESCRIPTION

Figure 4A:
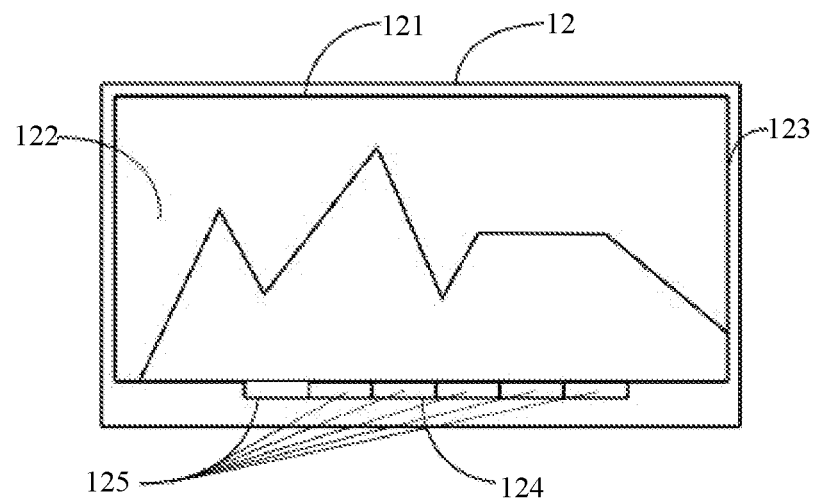
FIG. 4(a) is a schematic diagram of a first application solution of an operation region according to an embodiment of the present disclosure.

Technical solutions of embodiments of the present disclosure will be described in combination with the accompanying drawings of the embodiments of the present disclosure.

Referring to FIG. 1, an embodiment of the present disclosure provides a terminal 10, which may be a personal computer (PC), a tablet computer, a smart phone, a personal digital assistant (PDA), and the like.

In an exemplary embodiment of the present disclosure, the terminal 10 may include: a communication interface 11, a display screen 12, a memory 13, and a processor 14 connected to the communication interface 11, the memory 13 and the display screen 12.

In an exemplary embodiment of the present disclosure, the communication interface 11 may be a hardware interface in a physical sense or a logical interface in a software sense. Through the communication interface 11, the terminal 10 may receive multiple pictures directly transmitted by another device or transmitted through a network, which need to be displayed by the display screen 12 of the terminal 10 in a split screen.

In an exemplary embodiment of the present disclosure, the display screen 12 may be, for example, a Liquid Crystal Display (LCD), a Light-Emitting Diode (LED), or an Organic Light-Emitting Diode (OLED).

In an exemplary embodiment of the present disclosure, as shown in FIG. 2, the display screen 12 may display a display interface 121, wherein the display interface 121 may occupy all or part of the display screen 12. The display interface 121 may include one or more display regions, for example, it may include two display regions, which are a first display region 122 and a second display region 123, respectively, and the display interface 121 further includes an operation region 124 for a user to perform operations.

In an exemplary embodiment of the present disclosure, an operation region 124 is disposed within a display region or independently disposed outside the display regions. For example, the operation region 124 may be located in the first display region 122 and/or the second display region 123, or the operation region 124 may be used as a region in the display interface 121 that exists independently from the first display region 122 and the second display region 123.

In an exemplary embodiment of the present disclosure, the memory 13 may be, for example, a magnetic disk, a read only memory (ROM), a random access memory (RAM), or any combination thereof, and the memory 13 may be used to store a program for controlling split-screen display of two pictures.

In an exemplary embodiment of the present disclosure, the processor 14 may be a chip such as a Central Processing Unit (CPU 14), a Microcontroller Unit (MCU), a Field-Programmable Gate Array (FPGA), etc.

In an exemplary embodiment of the present disclosure, a processor 14 may be used to call and run a program in a memory 13, for example, to display a first picture among the received multiple pictures in the first display region 122 and to display a second picture among the received multiple pictures in the second display region 123. When the user operates in the operation region 124 on a display interface 121, by running the program, the processor 14 may replace the first picture displayed in the first display region 122 or the second picture displayed in the second display region 123 with a third picture (i.e., a picture to be switched) among the multiple pictures in response to the user's operation, thus achieving convenient and flexible switching of display of pictures.

In the following, how to display pictures and how to switch to display pictures will be described in detail through method embodiments.

Referring to FIG. 3, an embodiment of the present disclosure provides a method for displaying pictures, which can be executed by a terminal 10, and may include step S10:

Step S10: in response to a picture switching operation in an operation region, switching a picture in a display region to a picture to be switched corresponding to the picture switching operation.

In an exemplary embodiment of the present disclosure, for example, the display region may include, but are not limited to, a first display region 122 and a second display region 123;

wherein the step of switching the picture in the display region corresponding to the picture switching operation to the picture to be switched corresponding to the picture switching operation in response to the picture switching operation in the operation region may include steps S100 and S200:

Step S100: displaying a first picture in the first display region 122 and displaying a second picture in the second display region 123;

Step S200: determining a third picture corresponding to the picture switching operation, determining the first display region 122 corresponding to the picture switching operation, and replacing the first picture displayed in the first display region 122 with the third picture to be switched, or, determining the second display region 123 corresponding to the picture switching operation, and replacing the second picture displayed in the second display region 123 with the third picture to be switched.

Hereinafter, the aforementioned process will be described in detail with reference to examples.

Before step S100 is executed, the first display region 122, the second display region 123 and the operation region 124 may be used as elements that need to be displayed on a display interface 121, and the terminal 10 may preset related controls of these elements on a DOM (Document Object Model) tree. In this way, the terminal 10 runs the related controls of these elements by loading the DOM tree, and can display the first display region 122, the second display region 123 and the operation region 124 on the display interface 121.

In an exemplary embodiment of the present disclosure, the terminal 10 may also define a correspondence relation among the first display region 122, the second display region 123 and the operation region 124 in a rule tree.

In an exemplary embodiment of the present disclosure, for example, the terminal 10 may define in the rule tree a relation between the first display region 122 and a second display region 123 on a display interface 121 that the first display region 122 covers the second display region 123, and define that the size of the first display region 122 is adjustable and the size of the second display region 123 is not adjustable and can cover the display interface 121. In this way, by changing the size of the first display region 122, the size of the region displayed by the second display region 123 on the display interface 121 can be correspondingly changed.

In an exemplary embodiment of the present disclosure, for another example, the terminal 10 may also define in the rule tree that the first display region 122 and the second display region 123 are spliced on the display interface 121, and define that the relative sizes of the first display region 122 and the second display region 123 are adjustable. In this way, the size of the second display region 123 can be correspondingly changed by changing the size of the first display region 122, and vice versa.

In an exemplary embodiment of the present disclosure, the terminal 10 may also define a correspondence relation between the operation region 124 and multiple pictures to be displayed in the rule tree. In this way, while the user operates in the operation region 124, a terminal 10 responds to the user's operation based on the correspondence relation, so that the pictures displayed in the first display region 122 and/or the second display region 123 can be switched.

In an exemplary embodiment of the present disclosure, after the terminal 10 presets the related controls of all elements in the DOM tree and defines the relations between all the elements in the rule tree, the terminal 10 may perform step S100:

Step S100: displaying a first picture in the first display region and displaying a second picture in the second display region;

In an exemplary embodiment of the present disclosure, after obtaining multiple pictures, the terminal 10 may preload the multiple pictures into the memory of the terminal 10, so that when it is necessary to display, the terminal 10 directly executes a processing logic of picture display in the memory according to a preset correspondence relation, achieving a fast picture display without the user perceiving the loading process of pictures, which improves the user experience.

In an exemplary embodiment of the present disclosure, if the display interface 121 is in an initial state, i.e., neither the first display region 122 nor the second display region 123 of the display interface 12 displays any picture, there may be only the first display region 122 or the second display region 123 in the display interface 121, which is not defined here. For example, in the initial state, the first display region 122 and the second display region 123 may also be located in a display interface 12 at the same time.

In an exemplary embodiment of the present disclosure, the method may further include:

when displaying a picture on the display interface for the first time, selecting the pictures for initial display through the picture switching operation in response to the picture switching operation in the operation region, and determining a display mode on the display interface according to the number of pictures selected for initial display.

In an exemplary embodiment of the present disclosure, the initial state of the display interface 121 may be determined by the number of the pictures for initial display selected by the user.

In an exemplary embodiment of the present disclosure, the number of the pictures for initial display can be determined at one time according to the following first scheme and the initial state of the display interface 121 can also be determined gradually according to the following second scheme, and the display interface 121 displays one initial state after each time the number of pictures is determined. When the number of the pictures change gradually, the initial state of the display interface 121 changes accordingly.

First Scheme

In an exemplary embodiment of the present disclosure, determining the display mode on the display interface according to the number of the pictures selected for initial display may include:

acquiring the number of pictures to be switched selected in the picture switching operation;

when the number of the pictures to be switched is one, covering the display interface with the one picture to be switched to present the one picture to be switched on the display interface;

when the number of the pictures to be switched is multiple, dividing the display interface into multiple display regions by one or more divider lines, and displaying the multiple pictures to be switched in the multiple display regions respectively, so that the multiple pictures to be switched can be presented simultaneously in the multiple display regions.

In an exemplary embodiment of the present disclosure, the method may further include: changing a size and/or a shape of a display region by moving position and/or direction of a divider line.

In the exemplary embodiment of the present disclosure, attributes such as the shape, color, thickness, etc. of the divider line are not limited, and can be defined according to needs or personal preferences. For example, it can be a straight line, an arc, any curve, and the like.

Second Scheme

In an exemplary embodiment of the present disclosure, selecting the pictures for initial display through the picture switching operation in response to the picture switching operation in the operation region, and determining the display mode on the display interface according to the number of pictures selected for initial display may include:

acquiring the number of the pictures to be switched selected in the picture switching operation in response to the picture switching operation of the operation region for the first time;

when the number of the pictures to be switched is one, covering the display interface with the one picture to be switched;

acquiring the number of pictures to be switched selected in the current picture switching operation continuously in response to the picture switching operation in the operation region; and when the number of the pictures to be switched is two, dividing the display interface into a first display region and a second display region, displaying a first picture selected by the current picture switching operation in the first display region, and displaying a second picture selected by the current picture switching operation in the second display region.

In an exemplary embodiment of the present disclosure, after loading multiple pictures into a memory, the terminal 10 can load the first picture of the multiple pictures into the first display region 122 for display and load the second picture of the multiple pictures into a second display region 123 for display according to the user's selection.

In an exemplary embodiment of the present disclosure, as an exemplary way to display the first picture and the second picture, the terminal 10 may load and display a corresponding picture by responding to the user's operation when the picture is initially displayed.

In an exemplary embodiment of the present disclosure, the display interface may include one or more display regions and at least one operation region; the operation region includes multiple sub-regions 125;

one display region corresponds to at least one sub-region 125, and one sub-region 125 corresponds to one or one group of pictures to be switched; and/or, one sub-region 125 corresponds to one or one group of pictures to be switched, and neither the sub-region nor any of the pictures to be switched corresponds to the display region.

In an exemplary embodiment of the present disclosure, as shown in FIG. 4(a), in which one display region and one operation region are included, the display region corresponds to all sub-regions 125 of the operation region (i.e., the pictures in all the sub-region can be used to replace a picture in the display region), and one sub-region 125 corresponds to a schematic diagram containing one or a group of pictures to be switched.

Figure 4B:
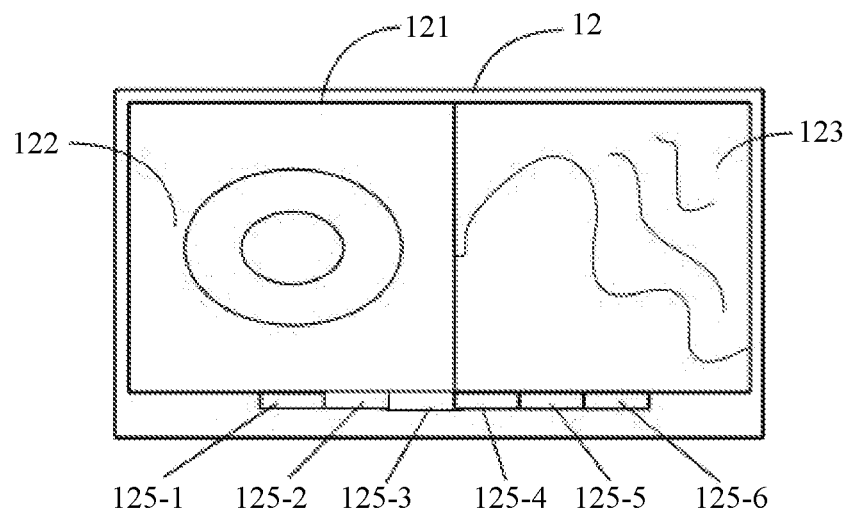
FIG. 4(b) is a schematic diagram of a second application solution of an operation region according to an embodiment of the present disclosure.

In an exemplary embodiment of the present disclosure, as shown in FIG. 4(b), in which two display regions (e.g., a first display region 122 and a second display region 123) and one operation region 124 are included, wherein the first display region corresponds to a part of sub-regions of the operation region (e.g., sub-regions 125-1, 125-2 and 125-3, and pictures in the sub-regions 125-1, 125-2, and 125-3 are used to replace the picture in the first display region), the first display region corresponds to the another part of the sub-regions of the operation region (e.g., sub-regions 125-4, 125-5 and 125-6, and pictures in the sub-regions 125-4, 125-5, and 125-6 are used to replace the picture in the second display region), and one sub-region corresponds to a schematic diagram containing one or one group of pictures to be switched.

Figure 4C:
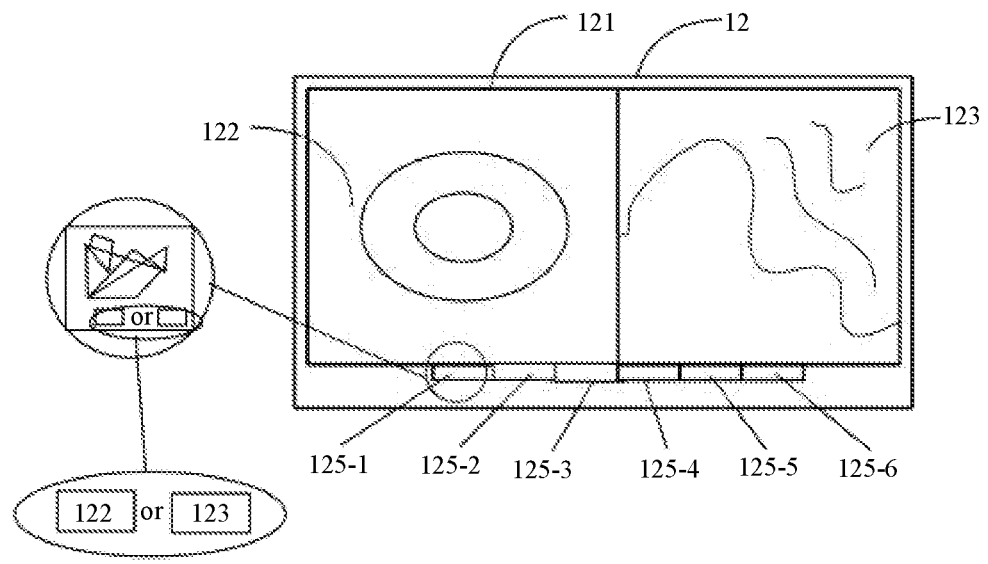
FIG. 4(c) is a schematic diagram of a third application solution of an operation region according to an embodiment of the present disclosure.

In an exemplary embodiment of the present disclosure, as shown in FIG. 4(c), in which two display regions (e.g., a first display region 122 and a second display region 123) and one operation region 124 are included, wherein all sub-regions of the operation region (e.g., pictures in sub-regions 125-1, 125-2, 125-3, 125-4, 125-5, and 125-6) can all be used to replace pictures in the first display region and the second display region (each picture is provided with options for the first display region or the second display region, which may also be referred to as selection marks. As the number of display regions in the display interface increases, the options corresponding to each picture also increase accordingly), and one sub-region corresponds to a schematic diagram containing one or one group of pictures to be switched. The first display region 122 or the second display region 123 in any picture is used to select whether the picture is used for replacing the picture in the first display region 122 or the picture in the second display region 123.

In an exemplary embodiment of the present disclosure, when each sub-region 125 corresponds to one group of pictures, different groups of pictures can be classified according to different types, colors, uses, etc., to facilitate searching; and multiple pictures in a group can also be numbered and indexed, which is more conducive to finding a target picture quickly.

Figure 4D:
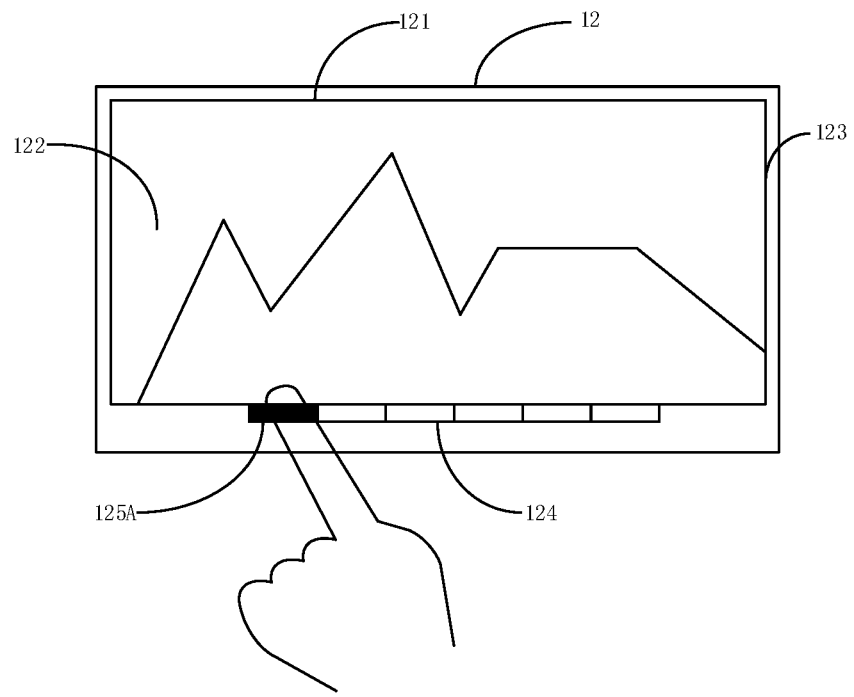
FIG. 4(d) is a diagram of a first application scenario of a method for displaying pictures according to an embodiment of the present disclosure.

In an exemplary embodiment of the present disclosure, as shown in FIG. 4(d), a schematic diagram of an embodiment in which one sub-region corresponds to one picture is provided. The operation region 124 may include multiple sub-regions 125 spliced with each other, and the number of the multiple sub-regions 125 may be the same as a maximum number of pictures allowed to be loaded into the memory by the terminal 10. In this way, after multiple pictures are loaded into the memory, the multiple sub-regions 125 can respectively correspond to one picture of the multiple pictures, and pictures corresponding to any two sub-regions 125 are different. In addition, in order to facilitate switching pictures displayed in the first display region 122 and/or the second display region 123, a correspondence relation between the multiple sub-regions 125 and the first display region 122 as well as the second display region 123 can also be established. For example, the first display region 122 corresponds to at least one sub-region 125 of the multiple sub-regions 125, while the second display region 123 corresponds to the rest of the multiple sub-regions 125 other than the sub-regions corresponding to the first display region 122.

In an exemplary embodiment of the present disclosure, the configuration that the multiple sub-regions 125 are arranged to be spliced with each other in the operation region 124 is only an exemplary mode of the present embodiment and is not a limitation on the present embodiment. For example, the multiple sub-regions 125 may also be disposed in an entire column in the operation region 124 without being spliced.

In an exemplary embodiment of the present disclosure, the arrangement of the multiple sub-regions 125 may be combined randomly, including, but are not limited to, in an entire row or an entire column, or in a formation of one or more geometric figures or patterns, and the arrangement of the sub-regions 125 is not limited here. In an exemplary embodiment of the present disclosure, a state of each sub-region 125 may include an unselected state and a selected state. If a user operates in a certain sub-region 125, the terminal 10 may switch the state of the sub-region 125 between the unselected state and the selected state in response to the operation.

In an exemplary embodiment of the present disclosure, based on the correspondence relation between each sub-region 125 and a picture and the state of each sub-region 125, if the terminal 10 controls a certain sub-region 125 to be in the selected state, it indicates that the picture corresponding to the sub-region 125 needs to be displayed in the first display region 122 or the second display region 123; otherwise, if the terminal 10 controls a certain sub-region 125 to be in the unselected state, it indicates that there is no need to display the picture corresponding to the sub-region 125 in the first display region 122 or the second display region 123.

In an exemplary embodiment of the present disclosure, after the terminal 10 loads multiple pictures into the memory, the terminal 10 controls all the multiple sub-regions 125 on a display interface 121 to be in the unselected state, for example, as shown in FIG. 4(d), when the sub-regions 125 are in the unselected state, the graphics of the sub-regions 125 can be in an unfilled state on the display interface 121, otherwise, they are in a filled state, in other words, the user can conveniently determine the state of each sub-region 125 by observing whether the graphics are filled or not.

In an exemplary embodiment of the present disclosure, when the user operates in a certain sub-region 125 which corresponds to the first picture and is currently unselected (the sub-region 125 in the unselected state can be understood as an unselected sub-region 125), the terminal 10 responds to the user's operation of selecting the sub-region 125 and adjusts the sub-region 125 from the unselected state to the selected state (the sub-region 125 in the selected state can be understood as a selected sub-region), and the first picture corresponding to the sub-region 125 is loaded into a first display region 122 for display.

In an exemplary embodiment of the present disclosure, at the same time, by responding to the user's operation of selecting a sub-region 125, the terminal 10 can obtain the number of sub-regions 125 currently selected by the user, and obviously the number of sub-regions 125 currently selected by the user is adjusted from 0 to 1 by the terminal. The number being 1 indicates that only one sub-region 125 corresponding to the first picture is selected at this time, and it further indicates that there is only one first picture that needs to be displayed at present. To fully display the first picture, when only one sub-region 125 is selected, the terminal 10 can control the size of the first display region 122 to be increased to cover the display interface 121, so that the first picture is displayed on the entire display interface 121.

In an exemplary embodiment of the present disclosure, when the user operates in another sub-region 125 which corresponds to a second picture and is currently unselected, such as touching the sub-region 125, a terminal 10 adjusts the sub-region 125 from the unselected state to the selected state in response to the user's operation of selecting the sub-region 125, and the second picture corresponding to the sub-region 125 is loaded into the second display region 123 for display.

In an exemplary embodiment of the present disclosure, at the same time, by responding to the user's operation of selecting sub-regions 125, the terminal 10 can continue to obtain the number of sub-regions 125 currently selected by the user, and obviously the number of sub-regions 125 currently selected by the user is adjusted from 1 to 2 by the terminal. Since the number reaches the upper limit of 2 (which can be determined according to the number of the display regions), the terminal 10 can control the first display region 122 to be reduced from the size covering the display interface 121 to an initial size (at the initial size of the first display region 122, the first display region 122 can occupy half of the display interface 121). Since the size of the first display region 122 is reduced to the initial size, the second display region 123 can be displayed on the display interface 121, so that the second picture displayed in the second display region 123 can be observed by the user.

In an exemplary embodiment of the present disclosure, referring to FIG. 4(d) and FIG. 5 in conjunction with FIG. 2, an example is given below to illustrate:

As shown in FIG. 4(d), when a finger of the user touches a currently unselected sub-region 125A to select the currently unselected sub-region 125A, the terminal 10 adjusts the unselected sub-region 125A from the unselected state to the selected state in response to the user's operation, and controls the graphics of the currently selected sub-region 125A to be in a filled state on the display interface 121. At the same time, the terminal 10 also controls the size of the first display region 122 to increase from the initial size to a size covering the display interface 121, and loads the first picture corresponding to the selected sub-region 125A into the first display region 122 for display.

Figure 5:
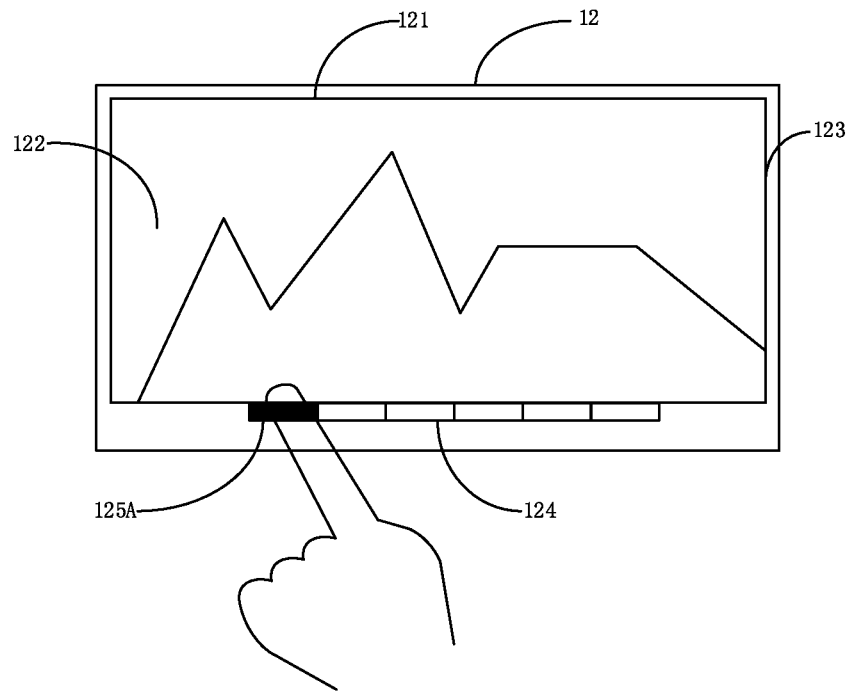
FIG. 5 is a diagram of a second application scenario of a method for displaying pictures according to an embodiment of the present disclosure.

As shown in FIG. 5, when the finger of the user continues to touch a currently unselected sub-region 125B to select the currently unselected sub-region 125B, the terminal 10 continues to adjusts the unselected sub-region 125B from the unselected state to the selected state in response to the user's operation, and controls the graphics of the selected sub-region 125B to be in a filled state on the display interface 121. At the same time, the terminal 10 also controls the first display region 122 to be reduced from the size covering the display interface 121 to the initial size, so that the second picture corresponding to the selected sub-region 125B can be observed by the user after being loaded and displayed in the second display region 123.

In an exemplary embodiment of the present disclosure, as another exemplary mode to display the first picture and the second picture, unlike the above-mentioned mode in which the user manually selects a regions to load a corresponding picture, the terminal 10 can automatically load and display when the picture is initially displayed, that is, the terminal 10 can automatically load and display a first picture in a first display region 122 and automatically load and display a second picture in a second display region 123 according to a preset picture display order to enable the user to observe the first picture and the second picture.

In an exemplary embodiment of the present disclosure, the terminal 10 may also automatically adjust a sub-region 125 corresponding to the first picture from the unselected state to the selected state, and automatically adjust a sub-region 125 corresponding to the second picture from the unselected state to the selected state as well. In this way, while the first picture and the second picture are displayed, the graphics of the two sub-regions 125 corresponding to the first picture and the second picture displayed on the display interface 121 are in a filled state, to facilitate the user to perform subsequent operations.

In an exemplary embodiment of the present disclosure, of course, besides the above-mentioned modes for displaying the first picture and the second picture, the user can also touch the two unselected sub-regions 125 at the same time of selecting the two unselected sub-regions 125 at the same time. Then, in response to the user's operation of selecting sub-regions, the terminal 10 can obtain that the number of sub-regions currently selected by the user is 2. If the number being 2 reaches the upper limit of the number, and if there is only one display region in the display interface 121 in the initial state, the terminal 10 can divide the display interface 121 into a first display region 122 and a second display region 123, and display a first picture corresponding to one sub-region currently selected by the user in the first display region 122 and a second picture corresponding to the other sub-region currently selected by the user in the second display region 234.

In an exemplary embodiment of the present disclosure, in step S200, a first picture displayed in the first display region or the second picture displayed in the first display region is replacing with a third picture (i.e., the picture to be switched) in response to the picture switching operation performed by the user in the operation region.

In an exemplary embodiment of the present disclosure, after the first picture and the second picture are displayed, if the user continues to operate in an unselected sub-region 125, the terminal 10 may also perform switching of pictures in response to the user's operation.

In an exemplary embodiment of the present disclosure, different picture switching modes may be included for different corresponding cases of sub-regions 125 in the operation region 124, for example, the following two cases may be included:

First Case:

In an exemplary embodiment of the present disclosure, when one display region corresponds to at least one sub-region and one sub-region corresponds to one or one group of pictures to be switched, switching the picture in the display region to the picture to be switched corresponding to the picture switching operation may include:

when one sub-region corresponds to one picture to be switched, determining the sub-region selected by the picture switching operation and the display region corresponding to the sub-region, and switching the picture in the display region corresponding to the sub-region to the picture to be switched;

when one sub-region corresponds to one group of pictures to be switched, determining the sub-region selected by the picture switching operation and the display region corresponding to the sub-region, presenting each picture in the group of pictures to be switched corresponding to the sub-region, detecting a selection operation on the presented pictures, and switching the pictures in the display region corresponding to the sub-region to the pictures selected by the selection operation; or, determining a preset probability corresponding to each picture, and switching the picture in the display region corresponding to the sub-region to the picture with the highest probability.

Second Case:

In an exemplary implementation, when one sub-region corresponds to one or one group of pictures to be switched, and neither the sub-region nor any of the pictures to be switched corresponds to the display region, switching the picture in the display region to the picture to be switched corresponding to the picture switching operation may include:

determining the number of display regions to be replaced; and determining a picture switching mode in the display region according to the number of the display regions to be replaced.

In an exemplary embodiment of the present disclosure, the scheme in the second case will be explained in detail below.

In an exemplary implementation, when the number of the display regions to be replaced is one, determining the picture switching mode in the display region according to the number of the display regions to be replaced may include:

displaying a selected picture to be switched in the display region according to a selection operation, or, replacing the picture in the display region with the picture to be switched in the sub-region according to a preset presentation order of each picture to be switched in all the pictures to be switched corresponding to the sub-region.

In an exemplary implementation, when the number of the display regions to be replaced is multiple, determining the picture switching mode in the display region according to the number of the display regions to be replaced may include:

if each picture to be switched among all the pictures to be switched corresponding to the sub-region is correspondingly provided with a selection mark for all the display regions, determining multiple selected pictures to be switched according to the selection operation, and displaying each selected picture to be switched in the display region selected by the selection mark corresponding to the picture to be switched; and if each picture to be switched among all the pictures to be switched corresponding to the sub-region is not provided with a selection mark for all the display regions, after determining multiple selected pictures to be switched according to the selection operation, sequentially replacing the sorted pictures in the display region with the pictures to be switched in the sub-region according to a preset presentation order of each picture to be switched in all the pictures to be switched corresponding to the sub-region; or, sequentially replacing the pictures in the display region that were not replaced in the last replacement operation with the pictures to be switched in the sub-region according to the presentation order; or, sequentially replacing multiple pictures displayed in the different display regions that have been sorted in order according to a selection order of the multiple selected pictures to be switched; or, randomly switching pictures in multiple display regions multiple pictures to be switched to.

In an exemplary embodiment of the present disclosure, the display region may include a first display region sorted as the first and a second display region sorted as the second;

sequentially replacing the sorted pictures in the display region with the pictures to be switched in the sub-region according to the preset presentation order of each picture to be switched in all the pictures to be switched corresponding to the sub-region may include:

automatically loading a first picture with a first presentation order in the multiple pictures to be switched into the first display region for display, and automatically loading a second picture with a second presentation order in the multiple pictures to be switched into the second display region for display.

In an exemplary embodiment of the present disclosure, such as the above embodiments: the terminal 10 can automatically load the display, that is, the terminal 10 can automatically load a first picture of the multiple pictures in a first display region 122 for display and load a second picture of the multiple pictures in a second display region 123 for display according to the preset picture display order (or referred to as a presentation order) to enable the user to observe the first picture and the second picture.

In an exemplary implementation, determining the multiple selected pictures to be switched according to the selection operation, and displaying each selected picture to be switched in the display region selected by the selection mark corresponding to the picture to be switched may include:

when one sub-region corresponds to one picture to be switched, determining the sub-region selected by a picture switching operation, presenting one picture to be switched corresponding to the sub-region, providing selection marks for all display regions corresponding to the pictures to be switched, detecting the selection operation on the provided selection marks, and replacing the pictures in the display region corresponding to the selection marks selected by the selection operation with the pictures to be switched selected by the picture switching operation; and when one sub-region corresponds to one group of pictures to be switched, determining the sub-region selected by the picture switching operation, presenting the group of pictures to be switched corresponding to the sub-region, presenting each picture in the group of pictures to be switched, detecting the selection operation on the presented pictures, providing selection marks for all display regions corresponding to the pictures to be switched after determining the selected pictures, detecting the selection operation on the provided selection marks, and replacing the pictures in the display region corresponding to the selection marks selected by the selection operation with the selected pictures to be switched.

In an exemplary embodiment of the present disclosure, regarding the first case, for example, when the user continues to operate in a currently unselected sub-region 125 which is different from the sub-regions corresponding to the first picture and the second picture, such as touching the sub-region 125, the terminal 10 adjusts the currently unselected sub-region 125 from an unselected state to a selected state in response to the user's operation of selecting the currently unselected sub-region 125, so that the currently unselected sub-region 125 becomes a currently selected sub-region 125. Furthermore, the terminal 10 also replaces the first picture displayed in the first display region 122 or the second picture displayed in the second display region 123 with a third picture corresponding to the sub-region 125 currently selected by the user. For example, if the sub-region selected by the user is the sub-region corresponding to the first display region 122, the terminal 10 replaces the first picture displayed in the first display region 122 with a third picture corresponding to the sub-region 125 currently selected by the user; or, if the sub-region selected by the user is the sub-region corresponding to the second display region 123, a terminal 10 replaces the second picture displayed in the second display region 123 with a third picture corresponding to the sub-region 125 currently selected by the user.

In an exemplary embodiment of the present disclosure, it can be understood that, since two sub-regions 125 have been selected before the currently unselected sub-region 125 is selected, the number of the currently selected sub-regions 125 is still kept at the maximum, so the terminal does not adjust the number of the currently selected sub-regions 125, and the terminal 10 can continue to display the first display region 122 and the second display region simultaneously on the display interface 121 without adjusting the size of the first display region 122.

In an exemplary embodiment of the present disclosure, while replacing the first picture displayed in the first display region 122 or the second picture displayed in the second display region 123 with the third picture, the terminal 10 also automatically adjusts the firstly selected sub-region 125, i.e., a sub-region 125 corresponding to the first picture, from the selected state to the unselected state. In this way, the graphic of the sub-region 125 corresponding to the first picture displayed on the display interface 121 is in an unfilled state, while the graphic of the sub-region 125 corresponding to the third picture displayed on the display interface 121 is in a filled state, so that the user can clearly know which sub-regions 125 are currently selected.

Figure 6:
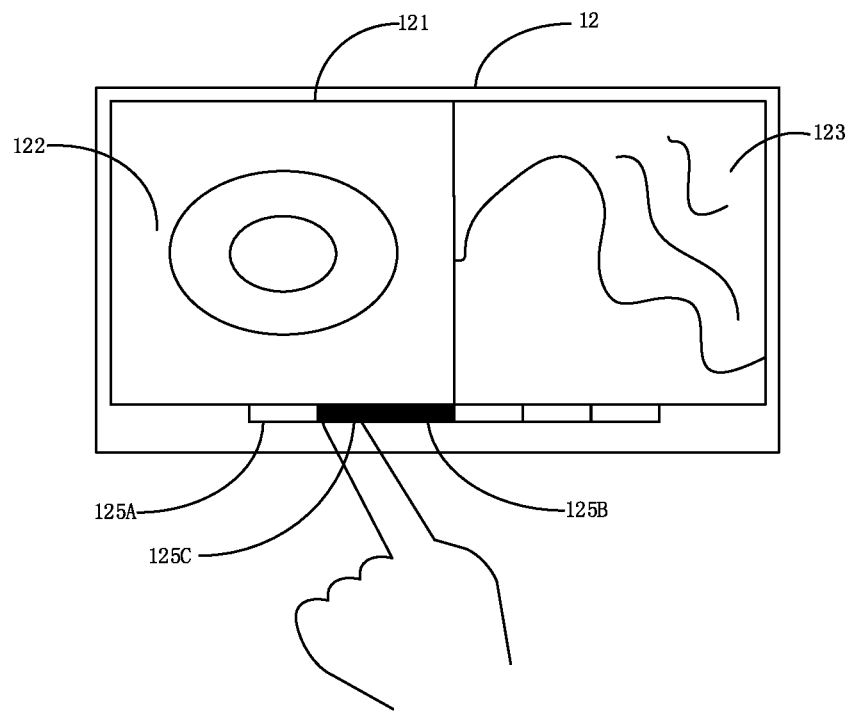
FIG. 6 is a diagram of a third application scenario of a method for displaying pictures according to an embodiment of the present disclosure.

In an exemplary embodiment of the present disclosure, referring to FIG. 6 in conjunction with FIG. 5, the foregoing example will continue to be explained below:

As shown in FIG. 6, when the user's finger continues to touch inside the currently unselected sub-region 125C to select a currently unselected sub-region 125C, a terminal 10 continues to respond to the user's operation, and adjusts the sub-region 125C from an unselected state to a selected state, adjusts the firstly selected sub-region 125, i.e., the selected sub-region 125A corresponding to the first picture, from the selected state to the unselected state, and replaces the first picture displayed in the first display region 122 with a third picture corresponding to the selected sub-region 125C. At this time, as shown in FIG. 6, the graphic of the sub-region 125C corresponding to the third picture may be in a filled state on the display interface 121, while the graphic of the sub-region 125A corresponding to the first picture may be in an unfilled state on the display interface 121.

In an exemplary embodiment of the present disclosure, the method may further include:

canceling the presentation of the picture to be switched corresponding to the picture switching operation on a display interface in response to a cancellation operation on the picture switching operation in the operation region;

detecting the number of pictures currently presented on the display interface after canceling the picture to be switched corresponding to the picture switching operation; and adjusting, according to the number of pictures currently presented on the display interface, a proportion of the pictures on the display interface.

In an exemplary embodiment of the present disclosure, after the first picture and the third picture are displayed, if the user continues to operate in a selected sub-region 125, the terminal 10 may also deselect the selected sub-region 125 in response to the user's operation.

In an exemplary embodiment of the present disclosure, if the first picture displayed in the first display region 122 is replaced with the third picture, when the user continues to operate in the sub-region 125 corresponding to the second picture, for example, touching the sub-region 125, a terminal 10 adjusts the sub-region 125 corresponding to the second picture from the selected state to the unselected state in response to the user's operation deselecting the selection of the sub-region 125 corresponding to the second picture, and, so that the graphic of the sub-region 125 corresponding to the second picture displayed on the display interface 121 is in an unfilled state. In an exemplary embodiment of the present disclosure, it can be understood that, if the terminal 10 responds to the user's operation of deselecting the sub-regions selected by the user, the terminal 10 may minus the number of sub-regions currently selected by the user by 1. Obviously, a terminal continues to acquire the number of sub-regions 125 currently selected by the user in response to the user's operation of deselecting the sub-region 125 corresponding to the second picture, and the number of sub-regions 125 currently selected by the user is adjusted from 2 to 1 by the terminal. The number being 1 indicates that only one sub-region 125 corresponding to the third picture among all the sub-regions 125 is the selected sub-region 125, which means that there is only one picture to be displayed at present. Therefore, in order to adequately display the third picture, the terminal 10 can control to increase the size of the first display region 122 to cover the display interface 121, in this way, the third picture corresponding to the sub-region currently selected by the user covers display interface 121 and is displayed on the entire display interface 121.

Figure 7:
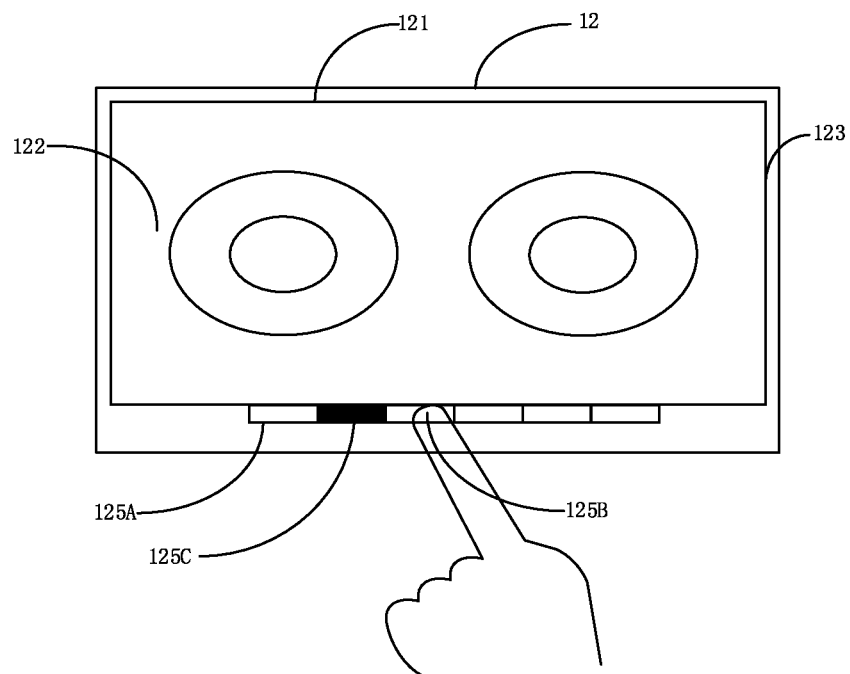
FIG. 7 is a diagram of a fourth application scenario of a method for displaying pictures according to an embodiment of the present disclosure.

In an exemplary embodiment of the present disclosure, referring to FIG. 7 in conjunction with FIG. 6, the foregoing example will continue to be explained below:

As shown in FIG. 7, when the user's finger continues to touch the currently selected sub-region 125B to deselect the sub-region 125B, a terminal 10 continues to adjust the selected sub-region 125B from a selected state to an unselected state in response to the user's deselecting operation, and increases the size of the first display interface 121 from the initial size to a size covering the display interface 121. At this time, as shown in FIG. 7, the third picture in the first display interface 121 can be entirely displayed on the display interface 121, while the graphic of the unselected sub-region 125B is in an unfilled state on the display interface 121. In an exemplary embodiment of the present disclosure, after the third picture is displayed on the entire display interface, if the user continues to operate in the sub-region 125 which is currently unselected and is different from the sub-region corresponding to the second picture, the terminal 10 can further adjust the sub-region 125 from the unselected state to the selected state in response to the user's operation of selecting the sub-region 125, and replace the second picture displayed in the second display region 123 with a fourth picture corresponding to the sub-region 125.

In an exemplary embodiment of the present disclosure, at the same time, if the terminal 10 responds to the user's operation of selecting the sub-region selected by the user, the terminal 10 may add the number of the sub-regions currently selected by the user by 1. Obviously, the terminal 10 continues to acquire the number of the sub-regions 125 currently selected by the user by responding to the user's operation of selecting the sub-region 125 which is currently unselected and different from the sub-region corresponding to the second picture. Obviously, the number of the sub-regions 125 currently selected by the user is adjusted from 1 to 2 by the terminal. Since the number being 2 reaches the upper limit, the terminal synchronously controls the size of the first display region 122 to be reduced from the size covering the display interface 121 to the initial size, thereby dividing the display interface 121 into a first display region 122 and a second display region 123 again, so that a fourth picture can be displayed on the display interface 121.

Figure 8:
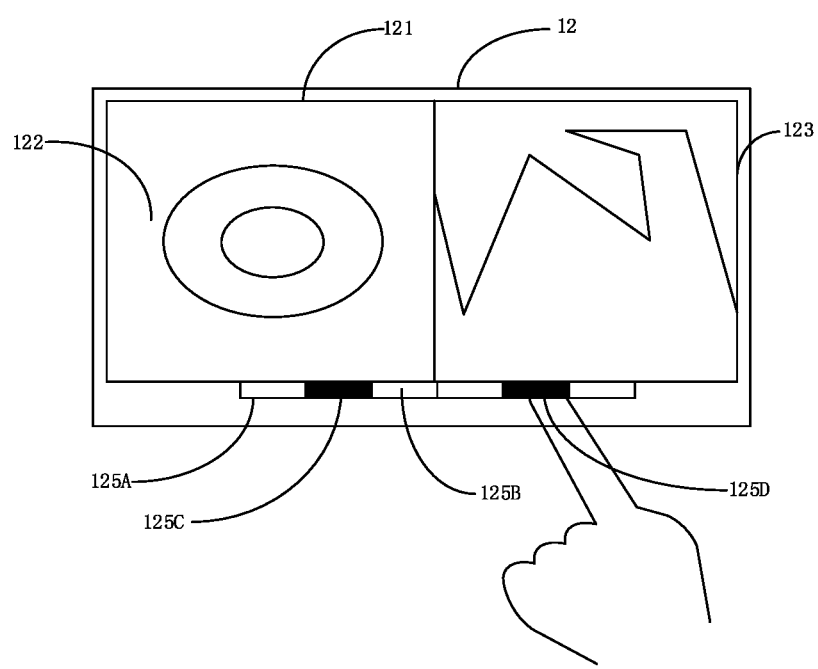
FIG. 8 is a diagram of a fifth application scenario of a method for displaying pictures according to an embodiment of the present disclosure.

In an exemplary embodiment of the present disclosure, referring to FIG. 8 in conjunction with FIG. 7, the foregoing example will continue to be explained below:

As shown in FIG. 8, when the user's finger continues to touch a currently unselected sub-region 125D to select the currently unselected sub-region 125D, the terminal 10 continues to adjusts the sub-region 125D from an unselected state to a selected state in response to the user's operation, and controls the graphic of the sub-region 125B to be in a filled state on the display interface 121. At the same time, the terminal 10 also controls the first display region 122 to be reduced from the size covering the display interface 121 to the initial size, so that the fourth picture corresponding to the sub-region 125D can be observed by the user after being loaded and displayed in the second display region 123.

In an exemplary embodiment of the present disclosure, regarding the second case, when multiple display regions, such as a first display region 122 and a second display region 123, are included in the display interface, a first picture may be displayed in the first display region and a second picture may be displayed in the second display region. A sub-region in the operation region 124 may correspond to neither one of the display regions, that is, pictures in any sub-region may replace pictures in the first display region and the second display region. The difference is that after selecting one picture in one sub-region, whether to replace the first picture or the second picture can be chosen.

In an exemplary embodiment of the present disclosure, the method may further include:

continuously responding to multiple picture switching operations in the operation region, and determining a display region corresponding to the picture switching operation and a picture to be switched after responding to each picture switching operation; and simultaneously switching the pictures in the display region corresponding to each picture switching operation into the pictures to be switched corresponding to the picture switching operation through one-click switching.

In an exemplary embodiment of the present disclosure, regarding the first case and the second case, multiple pictures can be selected at one time, and the selected pictures can be switched at the same time by one-click switching, thereby improving the convenience of operation, saving the operation time and improving the user experience.

In an exemplary embodiment of the present disclosure, regarding the second case, the pictures to be switched can also be automatically switched according to the presentation order of the pictures to be switched, the sorting of the display regions, the display region replaced by the last replacement operation, and the like. For example, the display regions may include a first display region 122 and a second display region 123; wherein sequentially replacing the pictures in the display region that were not replaced in the last replacement operation with the pictures to be switched in the sub-region according to the presentation order may include:

acquiring a display position of a picture corresponding to the previous selected sub-region;

replacing the first picture displayed in the first display region 122 with a third picture corresponding to the selected sub-region when the picture corresponding to the previous selected sub-region is displayed in the second display region 123; and replacing the second picture displayed in the second display region 123 with the third picture corresponding to the selected sub-region when the picture corresponding to the previous selected sub-region is displayed in the first display region 122.

In an exemplary embodiment of the present disclosure, the mode of switching and displaying pictures in the present embodiment is not limited to the aforementioned modes, and the terminal 10 can also select a display position of the currently switched picture according to the display position of the picture corresponding to the sub-region 125 previously selected by the user.

For example, in a process of replacing the first picture displayed in the first display region 122 or the second picture displayed in the second display region 123 with the third picture, the terminal 10 acquires the display position of the picture corresponding to the sub-region 125 previously selected by the user. If the picture corresponding to the sub-region 125 previously selected by the user is displayed in the second display region 123, the terminal 10 replaces the first picture displayed in the first display region 122 with the third picture corresponding to the sub-region 125 selected by the user. If the picture corresponding to the sub-region 125 previously selected by the user is displayed in the first display region 122, the terminal replaces the second picture displayed in the second display region 123 with the third picture corresponding to the sub-region 125 selected by the user.

In an exemplary embodiment of the present disclosure, the above-mentioned picture switching are performed according to the order of the selected sub-regions 125, but this does not constitute a limitation of the present embodiment. For example, a correspondence relation between each sub-region 125 and a display region can also be established in advance, so that when a certain sub-region 125 is selected, pictures can be displayed or replaced in the first display region 122 or the second display region 123 corresponding to the sub-region 125.

In an exemplary embodiment of the present disclosure, each sub-region may include at least one operation point, wherein each operation point corresponds to the display region, the sub-region, or at least one picture in the sub-region; when any one operation point is triggered, the corresponding function is operated in response to the trigger.

In an exemplary embodiment of the present disclosure, each of the sub-regions may include at least one operation point;

when one display region corresponds to at least one sub-region and one sub-region corresponds to one picture to be switched, the operation point of each sub-region is an operation point of the picture to be switched, and the operation point is used to determine whether the picture to be switched is selected;

when one display region corresponds to at least one sub-region and one sub-region corresponds to one group of pictures to be switched, the operation point of each sub-region is used to determine whether the group of pictures to be switched are selected; each picture in the group of pictures to be switched corresponds to one sub-operation point, and the sub-operation point is used to determine whether the picture is selected;

when one sub-region corresponds to one picture to be switched and the picture to be switched corresponds to all the display regions for selection, the operation point of each sub-region is the operation point of the picture to be switched, and the operation point is used to determine whether the picture to be switched is selected and select the display region to be replaced from all the display regions;

when one sub-region corresponds to one group of pictures to be switched and one picture to be switched corresponds to all the display regions for selection, the operation points of each sub-region is the operation point of the group of pictures to be switched, and the operation point is used to determine whether the group of pictures to be switched are selected, wherein each picture in the group of pictures to be switched corresponds to one sub-operation point, and the sub-operation point is used to determine whether the picture is selected and select the display region to be replaced from all the display regions;

when the display regions are multiple and the operation region include multiple sub-regions, one sub-region corresponds to one or one group of pictures to be switched, and the sub-region and any of the pictures to be switched do not correspond to the display regions, the operation point of each sub-region is the operation point of the picture to be switched, and the operation point is used to determine whether the picture to be switched is selected.

In an exemplary embodiment of the present disclosure, as shown in FIG. 4(c), the boxes marked with 122 and 123 displayed under each picture are two operation points included in the picture, wherein the two operation points are used to select the first display region and the second display region respectively.

Figure 9:
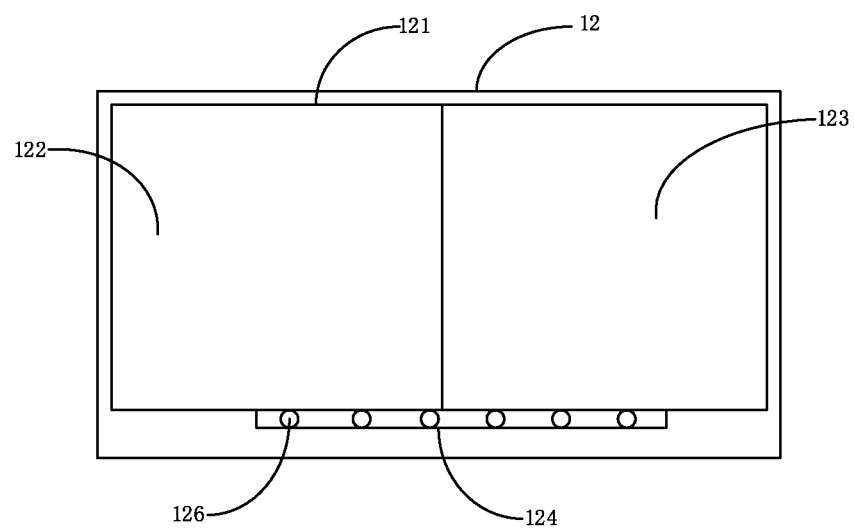
FIG. 9 is a diagram of a sixth application scenario of a method for displaying pictures according to an embodiment of the present disclosure.

In an exemplary embodiment of the present disclosure, referring to FIG. 9, in other implementations of the present embodiment, each sub-region 125 may correspondingly include one or more operation points 126. An image in each sub-region can correspond to one or more operation points respectively. FIG. 9 shows an embodiment in which one sub-region only contains one picture, and one sub-region corresponds to one operation point 126. When the user clicks an operation point of one sub-region, the terminal 10 can respond to the user's operation of selecting an unselected operation point 126 corresponding to the operation point, and replace a first picture displayed in the first display region 122 or a second picture displayed in the second display region 123 with a third picture corresponding to the unselected operation point 126, wherein the pictures corresponding to any two operation points 126 are different.

In an exemplary embodiment of the present disclosure, the principle of using the operation point 126 for interacting with the user and controlling is the same as that of the aforementioned operation region 124, which will not be further described here.

In an exemplary embodiment of the present disclosure, displaying pictures in the display region is only an exemplary way of the present embodiment, and does not constitute a limitation on the present embodiment. For example, the display region may also display videos, engineering models, and the like.

Figure 10:
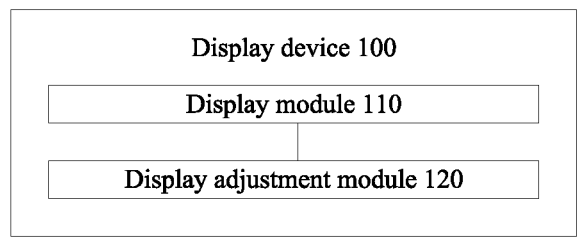
FIG. 10 is a schematic block diagram of a structure of a device for displaying pictures according to an embodiment of the present disclosure.

In an exemplary embodiment of the present disclosure, referring to FIG. 10, based on the same inventive concept, an embodiment of the present disclosure further provides a device 100 for displaying pictures, the device 100 for displaying pictures may be a program module deployed on a terminal 10, and the device 100 for displaying pictures may include a display module 110 and a display adjustment module 120; wherein the display module 110 includes a display interface, and the display interface includes a display region and an operation region;

the display module 110 is configured to display a picture in the display region; the display region may include a first display region and a second display region;

the display adjustment module 12 is configured to switch the picture in the display region corresponding to a picture switching operation to the picture to be switched corresponding to the picture switching operation in response to the picture switching operation in the operation region. For example, when the user operates in the operation region (picture switching operation), in response to the operation, the first picture displayed in the first display region or the second picture displayed in the second display region is replaced with a third picture.

In an exemplary embodiment of the present disclosure, the operation region may include multiple sub-regions, each of which corresponds to one picture; the first display region corresponds to at least one sub-region among the multiple sub-regions, and the second display region corresponds to the remaining sub-regions except the sub-region corresponding to the first display region. The display adjustment module 120 is configured to replace the first picture displayed in the first display region with the third picture corresponding to the sub-region selected by the user if the sub-region selected by the user is a sub-region corresponding to the first display region, and replace the second picture displayed in the second display region with the third picture corresponding to the sub-region selected by the user if the sub-region selected by the user is a sub-region corresponding to the second display region.

In an exemplary embodiment of the present disclosure, the operation region includes multiple sub-regions, each of which corresponds to one picture, and the display adjustment module 120 is configured to acquire a display position of a picture corresponding to the sub-region previously selected by the user; replace the first picture displayed in the first display region with the third picture corresponding to the sub-region selected by the user if the picture corresponding to the sub-region previously selected by the user is displayed in the second display region; and replace the second picture displayed in the second display region with the third picture corresponding to the sub-region selected by the user if the picture corresponding to the sub-region previously selected by the user is displayed in the first display region.

In an exemplary embodiment of the present disclosure, after the display adjustment module 120 replaces the first picture displayed in the first display region or the second picture displayed in the second display region with the third picture, the display adjustment module 120 is further configured to acquire the number of sub-regions currently selected by the user in response to the user's operation of deselecting the sub-region selected by the user; wherein if the number of the sub-regions currently selected by the user is 1, the picture corresponding to the sub-region currently selected by the user covers the display interface.

In an exemplary embodiment of the present disclosure, after the display adjustment module 120 covers the display interface with the picture corresponding to the sub-region currently selected by the user, the display adjustment module 120 is further configured to acquire the number of sub-regions currently selected by the user in response to the user's operation of selecting sub-regions; divide the display interface into the first display region and the second display region if the number of the sub-regions currently selected by the user is 2, and display pictures corresponding to the sub-regions currently selected by the user in the first display region and the second display region respectively.

In an exemplary embodiment of the present disclosure, each sub-region includes at least one operation point, wherein each operation point corresponds to a picture corresponding to the sub-region in one-to-one correspondence; when the user clicks an operation point of one sub-region, the operation of selecting the sub-region by the user is responded.

In an exemplary embodiment of the present disclosure, the operation region includes multiple sub-regions, each of which corresponds to one picture. The display adjustment module 120 is configured to acquire the number of sub-regions currently selected by the user in response to the operation of selecting sub-regions by the user; divide the display interface into the first display region and the second display region if the number of sub-regions simultaneously selected by the user is 2, display a first picture corresponding to a sub-region currently selected by the user in the first display region, and displaying a second picture corresponding to a sub-region currently selected by the user in the second display region.

In an exemplary embodiment of the present disclosure, the operation region includes multiple sub-regions, each of which corresponds to one picture. The display adjustment module 120 is configured to acquire the number of sub-regions currently selected by the user in response to the operation of selecting sub-regions by the user; cover the display interface with the first picture corresponding to the sub-region currently selected by the user if the number of the sub-regions currently selected by the user is 1; continue to acquire the number of sub-regions currently selected by the user in response to the operation of selecting sub-regions by the user; and divide the display interface into the first display region and the second display region if the number of the sub-regions currently selected by the user is 2, display a first picture corresponding to a sub-region currently selected by the user in the first display region, and display a second picture corresponding to a sub-region currently selected by the user in the second display region.

Those skilled in the art can clearly understand that, for the convenience and conciseness of description, the specific working process of the modules described above can refer to the corresponding process in the aforementioned method embodiments, which will not be described in detail here.

An embodiment of the present disclosure further provides a terminal, as shown in FIG. 1, the terminal may include a memory 13, a display screen (or a display) 12, and a processor 14 connected to the memory 13 and the display screen 12;

the memory 13 is configured to store a program of the method for displaying pictures according to any one of the above embodiments;

a display interface is provided on the display screen 12, and a divider line for dividing the display interface into a first display region and a second display region may be provided on the display interface; and and the processor 14 is configured to run the program in the memory.

An embodiment of the present disclosure further provides a computer readable storage medium that stores program instructions that, when executed, enables implementation of the method for displaying pictures described in any of the above embodiments.

An embodiment of the present disclosure further provides computer readable storage medium storing a computer executable non-volatile program code, wherein the storage medium can be a general storage medium, such as a removable disk, a hard disk, etc., on which the program code is stored, and when executed by a computer, the program code performs the steps of the method for displaying pictures of any of the above embodiments.

A program code product of the method for displaying pictures provided by an embodiment of the present disclosure includes a computer readable storage medium storing the program code, and instructions included in the program code can be used to perform the method in the previous method embodiment, and the implementation thereof can also be referred to the method embodiment, which will not be described in detail here.

To sum up, embodiments of the present disclosure provide a method for displaying pictures, a device and a terminal, for achieving convenient and flexible switching of pictures to be displayed. By providing an operation region in the display interface, as long as the user performs the picture switching operation in the operation region, the picture displayed in a display region can be replaced and updated, so that the user can flexibly switch the picture to be displayed, and the use by the user is no longer restricted, thus improving the user experience.

In the embodiments provided by this disclosure, it should be understood that the disclosed device and method can be implemented in other ways. The device embodiments described above are only schematic. For example, the division of the unit is only a logical function division, and there may be another approach of division in actual implementation. For another example, multiple units or components may be combined or integrated into another system, or some features may be ignored or not implemented. On the other hand, the mutual coupling or direct coupling or communication connection shown or discussed may be indirect coupling or communication connection through some communication interfaces, devices or units, and may be in electrical, mechanical or other forms.

In addition, units described as separate components may or may not be physically separated, and components displayed as units may or may not be physical units, that is, they may be located in one place or distributed to multiple network units. Some or all of the units can be selected according to actual needs to achieve the purpose of the present embodiments.

In addition, each functional module in the embodiments of the present disclosure may be integrated together to form an independent part, or may exist separately, or, two or more modules may be integrated to form an independent part.

In the description, relational terms such as "first" and "second" are used only to distinguish one entity or operation from another, and do not necessarily require or imply any such actual relation or order between these entities or operations.

The above are only embodiments of the present disclosure, and are not used to limit the protection scope of the present disclosure. For those skilled in the art, the present disclosure can be modified and varied. Any modification, equivalent substitution, improvement, etc. made within the spirit and principle of the present disclosure shall be included in the protection scope of the present disclosure.

What is claimed is:

1. A method for displaying pictures, wherein a display interface comprises a first display region, a second display region and an operation region, and the method comprises:
- displaying a first picture in the first display region and displaying a second picture in the second display region; and
- in response to a picture switching operation performed by a user in the operation region, replacing the first picture displayed in the first display region or the second picture displayed in the second display region with a third picture;
- wherein the operation region comprises a plurality of sub-regions, each of the plurality of sub-regions corresponds to one picture, and in response to the picture switching operation performed by the user in the operation region, replacing the first picture displayed in the first display region or the second picture displayed in the second display region with the third picture comprises:
- acquiring a display position of a picture corresponding to a sub-region previously selected by the user;
- replacing the first picture displayed in the first display region with the third picture corresponding to a sub-region selected by the user if the display position of the picture corresponding to the sub-region previously selected by the user is in the second display region; and
- replacing the second picture displayed in the second display region with the third picture corresponding to the sub-region selected by the user when the display position of the picture corresponding to the sub-region previously selected by the user is in the first display region;
- wherein the operation region comprises a plurality of sub-regions, each of the plurality of sub-regions corresponds to one picture, and displaying the first picture in the first display region and displaying the second picture in the second display region comprises:
- acquiring number of sub-regions currently selected by the user in response to an operation of selecting a sub-region performed by the user;
- if the number of the sub-regions currently selected by the user is two, dividing the display interface into the first display region and the second display region, displaying the first picture corresponding to a sub-region currently selected by user in the first display region, and displaying the second picture corresponding to a sub-region currently selected by user in the second display region.

2. The method for displaying pictures according to claim 1, wherein after replacing the first picture displayed in the first display region or the second picture displayed in the second display region with the third picture, the method further comprises:
- acquiring number of sub-regions currently selected by the user in response to an operation of cancelling selection of the sub-region selected by the user performed by the user; and
- if the number of the sub-regions currently selected by the user is one, covering the display interface with a picture corresponding to the sub-region currently selected by the user.

3. The method for displaying pictures according to claim 2, wherein after covering the display interface with the picture corresponding to the sub-region currently selected by the user, the method further comprises:
- acquiring the number of the sub-regions currently selected by the user in response to an operation of selecting the sub-region performed by the user; and
- if the number of the sub-regions currently selected by the user is two, dividing the display interface into the first display region and the second display region, displaying pictures corresponding to the sub-regions currently selected by the user in the first display region and the second display region respectively.

4. The method for displaying pictures according to claim 1, wherein each of the sub-regions comprises one operation point, and each operation point corresponds to a picture corresponding to the sub-region in one-to-one correspondence; when clicking on the operation point of one sub-region is executed by the user, an operation of selecting the sub-region by the user is performed.

5. The method for displaying pictures according to claim 1, wherein the operation region comprises a plurality of sub-regions, each of the plurality of sub-regions corresponds to one picture, and displaying the first picture in the first display region and displaying the second picture in the second display region further comprises:
- acquiring number of sub-regions currently selected by the user in response to an operation of selecting a sub-region performed by the user;
- if the number of the sub-regions currently selected by the user is one, covering the display interface with the first picture corresponding to the sub-region currently selected by the user;
- acquiring the number of the sub-regions currently selected by the user continuously in response to the operation of selecting a sub-region performed by the user; and
- if the number of the sub-regions currently selected by the user is two, dividing the display interface into the first display region and the second display region, displaying the first picture corresponding to a sub-region currently selected by user in the first display region, and displaying the second picture corresponding to a sub-region currently selected by user in the second display region.

6. A terminal comprising a memory, a display screen, and a processor connected to the memory and the display screen;
- wherein the memory is configured to store a program of the method for displaying pictures according to claim 1;
- the display is provided thereon with the display interface, and a divider line configured to divide the display interface into the first display region and the second display region is provided on the display interface; and
- the processor is configured to run the program in the memory.

7. A picture display device, wherein a display interface comprises a first display region, a second display region and an operation region, and the device comprises:
- a picture display module configured to display a first picture in the first display region and display a second picture in the second display region; and
- a display adjustment module configured to replace, when a user performs an operation in the operation region, the first picture displayed in the first display region or the second picture displayed in the second display region with a third picture in response to the operation;
- wherein the operation region comprises a plurality of sub-regions, each of the plurality of sub-regions corresponds to one picture, and in response to a picture switching operation performed by the user in the operation region, the display adjustment module is further configured to:

acquire a display position of a picture corresponding to a sub-region previously selected by the user;

replace the first picture displayed in the first display region with the third picture corresponding to a sub-region selected by the user if the display position of the picture corresponding to the sub-region previously selected by the user is in the second display region; and replace the second picture displayed in the second display region with the third picture corresponding to the sub-region selected by the user when the display position of the picture corresponding to the sub-region previously selected by the user is in the first display region;

wherein the operation region comprises a plurality of sub-regions, each of the plurality of sub-regions corresponds to one picture, and the picture display module is configured to:

acquire number of sub-regions currently selected by the user in response to an operation of selecting a sub-region performed by the user;

if the number of the sub-regions currently selected by the user is two, divide the display interface into the first display region and the second display region, display the first picture corresponding to a sub-region currently selected by user in the first display region, and display the second picture corresponding to a sub-region currently selected by user in the second display region.

* * * * *